Feb. 28, 1928.
W. J. FARMER
RIM BREAKER
Filed Jan. 22, 1927
1,660,747
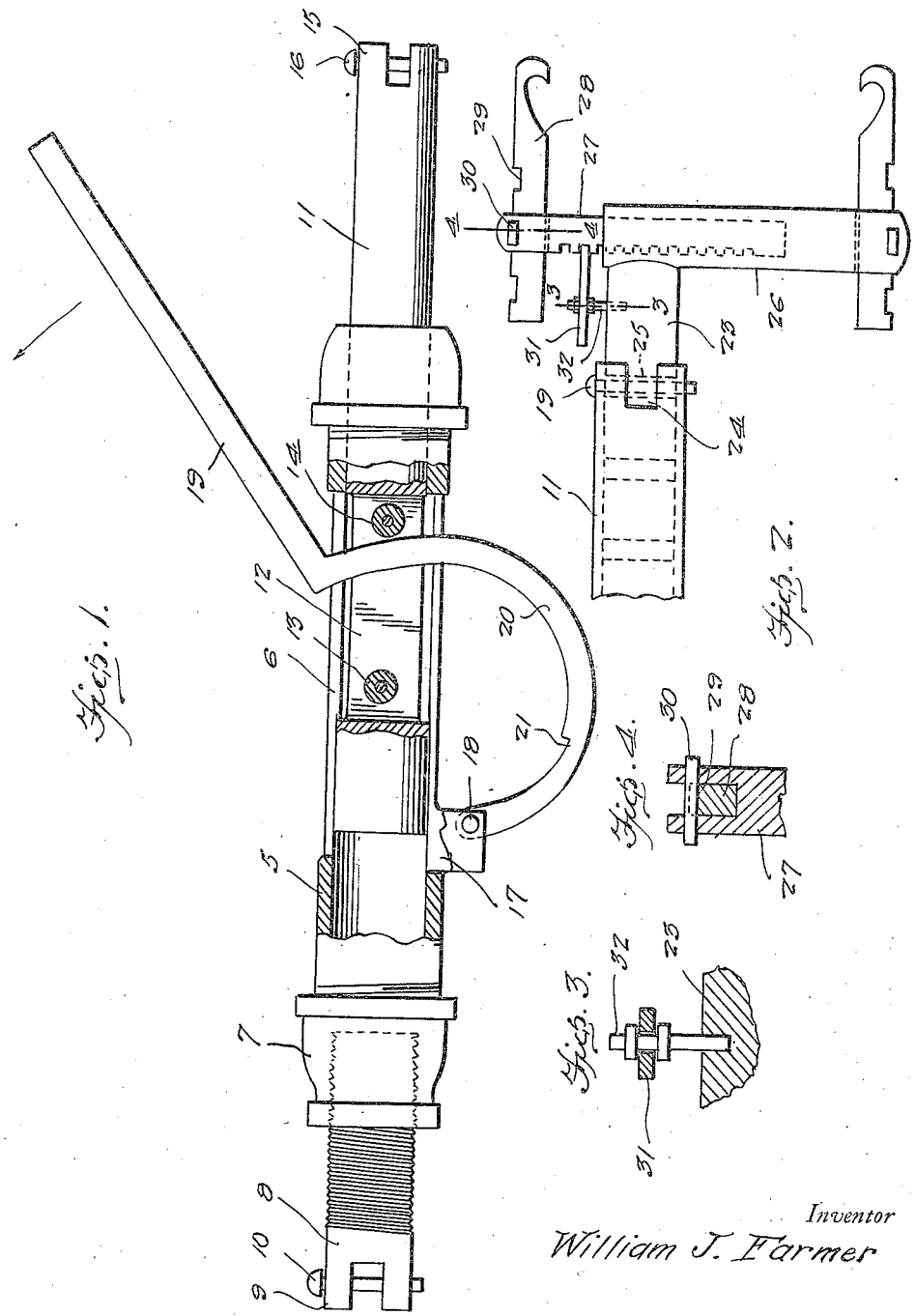
Inventor
*William J. Farmer*
By *Clarence A. O'Brien*
Attorney Patented Feb. 28, 1928.

1,660,747

UNITED STATES PATENT OFFICE.

WILLIAM J. FARMER, OF WIRT, OKLAHOMA.

RIM BREAKER.

Application filed January 22, 1927. Serial No. 162,866.

The present invention relates to an automobile tire rim tool and has for its principal object to provide a device of this nature which is useful in expanding and contracting automobile tire rims in taking off and putting on tires, an operation which is well known in this art.

Another very important object of the invention lies in the provision of a tool of this nature which is comparatively simple in its construction, inexpensive to manufacture, strong and durable, thoroughly efficient and reliable in operation, easy to manipulate, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:—

Figure 1 is a sectional elevation of the tool embodying the features of my invention, Fig. 2 is an elevation of one end thereof showing an attachment thereon, Fig. 3 is a detail section taken substantially on the line 3—3 of Fig. 2, Fig. 4 is a detailed section taken substantially on the line 4—4 of Fig. 2.

Referring to the drawing in detail it will be seen that the numeral 5 denotes an elongated hollow tubular member which is provided intermediate its ends with diametrically opposed longitudinally extending slots 6. A coupling 7 is threaded on one end of the hollow tubular member 5 and threadedly receives a shank 8 having a bifurcated end 9 with a pin 10 piercing the same so that the shank may be engaged with a lug on the tire rim, the furcations of the end 9 straddling the lug and the pin 10 piercing the opening in the lug. It will thus be seen that the shank 8 may be adjusted in relation to the member 5.

An elongated shank 11 is slidable through the other end of the hollow tubular member 5 and this is provided intermediate its ends with a longitudinally extending slot 12 adapted to register with the slots 6. Rollers 13 and 14 are journaled in spaced relationship in the slot 12. The outer end of the elongated shank 11 is bifurcated as is indicated at 15 and the furcations thereof are pierced by pins 16 so that this end may be engaged with the tire rim lug in the same manner as the bifurcated end 9 as previously indicated. Lugs 17 project from the hollow tubular member 5 adjacent one end of one of the slots 6, one lug on each side of said slot so as to pivotally receive therebetween as at 18 a lever 19 the pivoted end of which is curved as is indicated at 20 to form a cam portion. The lever extends through the slots 6 and 12 and the cam portion 20 is adapted to engage with the rollers 13 and 14 so that as the lever is swung back and forth it will alternately engage the rollers 13 and 14 to telescope the shank 11 into the member 5 or out of the member 5 as may be desired for contracting or expanding the rim respectively. When the parts are located as at Fig. 1 it will be seen that the operator may release the handle 19 and the rim will stay expanded and when the lever is swung to the left of Fig. 1 to engage the roller 13 the rim may be contracted and when the notch 21 engages the roller 13 the rim may be held in a contracted position without any further effort on the part of the operator.

If desired on one or both of the ends of the tool just described there may be placed an attachment such as is disclosed in Figs. 2 to 4 inclusive. Referring to this attachment in detail it will be seen that the numeral 23 denotes a shank which is reduced at one end as at 24 and is provided with an opening 25 so that pins 19 or 10 may pass therethrough to hold the shank in extension engagement with either shank 11 or 8. A tubular member 26 is mounted transversely on the shank 23 and slidably receives a rack member 27. The outer ends of the rack member 27 and the tubular member 26 are bifurcated as is shown in Fig. 4 for receiving jaws 28 which are notched as at 29 and keys 30 extend through openings in the bifurcated ends of the members 26 and 27 to engage in the notches 29 to hold the jaws 28 in different adjusted positions. These jaws 28 are adapted to engage over the edges or flanges of the rim as will be apparent. The rack member 27 is adjustable in relation to the tubular member 26 as will be apparent and a pivoted pawl 31 is mounted by means of pins 32 on the shank 23 to engage between the teeth of the ratchet member 27 to hold it in adjusted position in relation to the member 26.

It is thought that the construction, operation, and advantages of this invention will now be quite apparent to those skilled in this art without a more detailed description thereof. The present embodiment of the invention has been disclosed in detail merely by way of example since in actual practice it attains the features enumerated as desirable in the statement of the invention and the above description.

Having thus described my invention, what I claim as new is:—

1. A rim breaker including a tubular hollow member, a shank slidable in the hollow member, engaging means on the ends of the shank and member, registering slots in the member and shank, a lever, means for pivoting one end of the lever on an intermediate portion of the tubular member, said lever extending through the slots, rollers journaled in spaced relation in the slot of the shank to be engaged by the lever for sliding the shank in the tubular member.

2. A rim breaker comprising, in combination, a tubular member of hollow construction having diametrically opposed longitudinally extending slots, an adjustable shank engaged on one end of the tubular member, an elongated shank slidable in the other end of the tubular member and provided with a longitudinally extending slot registrable with the slots of the tubular member, rim-engaging means on the outer ends of the shanks, a lever, means pivoting one end of the lever on the tubular member, said lever extending through the slots, means disposed in spaced relation within the slot of the second shank with which the lever engages.

3. A rim breaker comprising a shank, a tubular member on the shank, a rack bar slidable in the tubular member, means for holding the rack bar in different adjusted positions in relation to the tubular member, the outer end of the tubular member and the outer end of the shank being bifurcated, jaws receivable between the furcations of the bifurcated ends, keys passing through openings in the furcations of the bifurcated ends, said jaws being provided with notches to receive the keys so that the jaws may be held in different adjusted positions.

4. In combination, a rim expanding tool and an attachment, said attachment comprising a shank, means for engaging the shank with the tool, a tubular member disposed transversely on the shank, a rack bar slidable in the tubular member, means for holding the rack bar in different adjusted positions in relation to the tubular member, a jaw adjustably mounted on the end of the tubular member, a second jaw adjustably mounted on the end of the rack bar.

In testimony whereof I affix my signature.

WILLIAM J. FARMER.